United States Patent
Broberg

(10) Patent No.: US 10,218,935 B2
(45) Date of Patent: Feb. 26, 2019

(54) AUTOMATED RUN-TIME ADJUSTMENT

(71) Applicant: Cable Television Laboratories, Inc., Louisville, CO (US)

(72) Inventor: David K. Broberg, Coupleville, WA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/959,136

(22) Filed: Dec. 4, 2015

(65) Prior Publication Data
US 2018/0091763 A1    Mar. 29, 2018

Related U.S. Application Data

(63) Continuation of application No. 12/256,728, filed on Oct. 23, 2008, now Pat. No. 9,210,369.

(51) Int. Cl.
| | |
|---|---|
| *H04N 5/76* | (2006.01) |
| *H04N 5/782* | (2006.01) |
| *H04N 7/16* | (2011.01) |
| *H04N 21/262* | (2011.01) |
| *H04N 21/436* | (2011.01) |
| *H04N 21/458* | (2011.01) |
| *H04N 21/472* | (2011.01) |
| *H04N 5/765* | (2006.01) |
| *H04N 9/82* | (2006.01) |

(52) U.S. Cl.
CPC .............. *H04N 5/782* (2013.01); *H04N 5/76* (2013.01); *H04N 7/163* (2013.01); *H04N 21/262* (2013.01); *H04N 21/43622* (2013.01); *H04N 21/4583* (2013.01); *H04N 21/47214* (2013.01); *H04N 5/765* (2013.01); *H04N 9/8205* (2013.01)

(58) Field of Classification Search
None
See application file for complete search history.

(56) References Cited

U.S. PATENT DOCUMENTS

| | | | | |
|---|---|---|---|---|
| 2007/0058949 | A1* | 3/2007 | Hamzy | G11B 27/034 386/292 |
| 2007/0136749 | A1* | 6/2007 | Hawkins | H04N 5/44543 725/38 |
| 2007/0157250 | A1* | 7/2007 | Morris | H04N 5/782 725/58 |
| 2008/0163304 | A1* | 7/2008 | Ellis | H04N 5/44543 725/50 |
| 2008/0252780 | A1* | 10/2008 | Polumbus a/k/a Tad Polumbus | H04N 17/00 348/468 |

* cited by examiner

*Primary Examiner* — Eileen M Adams
(74) *Attorney, Agent, or Firm* — Armstrong Teasdale LLP

(57) ABSTRACT

A method and system for automated run-time adjustment that includes an ability to start or end a scheduled recording at an earlier or later period of time. The adjustment may allow a program to be recorded in its entirety regardless of whether the program is starting late or running long. The recording period adjustments performed in accordance with the contemplated run-time adjustment may be made with reliance on data transmitted with the program in order to optionally insure the adjustment are made with respect to the actual content and not some pre-determined or arbitrary recording extension inputted by a user.

23 Claims, 3 Drawing Sheets

AUTOMATED RUN-TIME ADJUSTMENT

RELATED APPLICATIONS

This application claims priority to U.S. application Ser. No. 12/256,728, filed 23 Oct. 2008, which are incorporated herein by reference.

TECHNICAL FIELD

The present invention relates to automatically adjusting recording periods depending on run-time variations of recorded content, such as but not limited to adjusting a beginning or ending of a recording period depending on whether a recorded television program is running shorter or longer than its scheduled run-time.

BACKGROUND

The broadcast or transmission of television programs and other types of content is typically based on a scheduled run-time wherein the run-time specifies a period of time during which the program will be available. The run-time is defined by a scheduled starting and ending time, such from 1 pm to 4 pm. Not all programs start or finish at the scheduled starting or ending times. The actual length of a sporting event, awards show, or other live event may actually run longer or shorter than the scheduled run-time.

Electronic programming guides (EPGs), digital video recorders (DVRs), and other interfaces and/or devices used to record or to direct the recording of content rely on the scheduled run-time to set a recording period during which the content is actively recorded. If the actual program length differs from the scheduled run-time, the recording length differs from that which is necessary to record the actual showing of the program. This can result in too little or too much recording of the television channel or content stream showing the program.

Ending the recording period after the actual completion of the program is more preferable than ending the recording prior to the actual completion of the program. A recording system may provide a user with an option to add additional recording time to the end of the scheduled run-time in the hope of assuring that the additional, user selected period is sufficient to cover the actual ending of the program should the program run past the scheduled recording time. In some cases, this additional recording time may simply result in excessive, unnecessary recordings and in other cases, it still may not be sufficient to record the actual completion of the program.

BRIEF DESCRIPTION OF THE INVENTION

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE FIGURES

Figure 1:
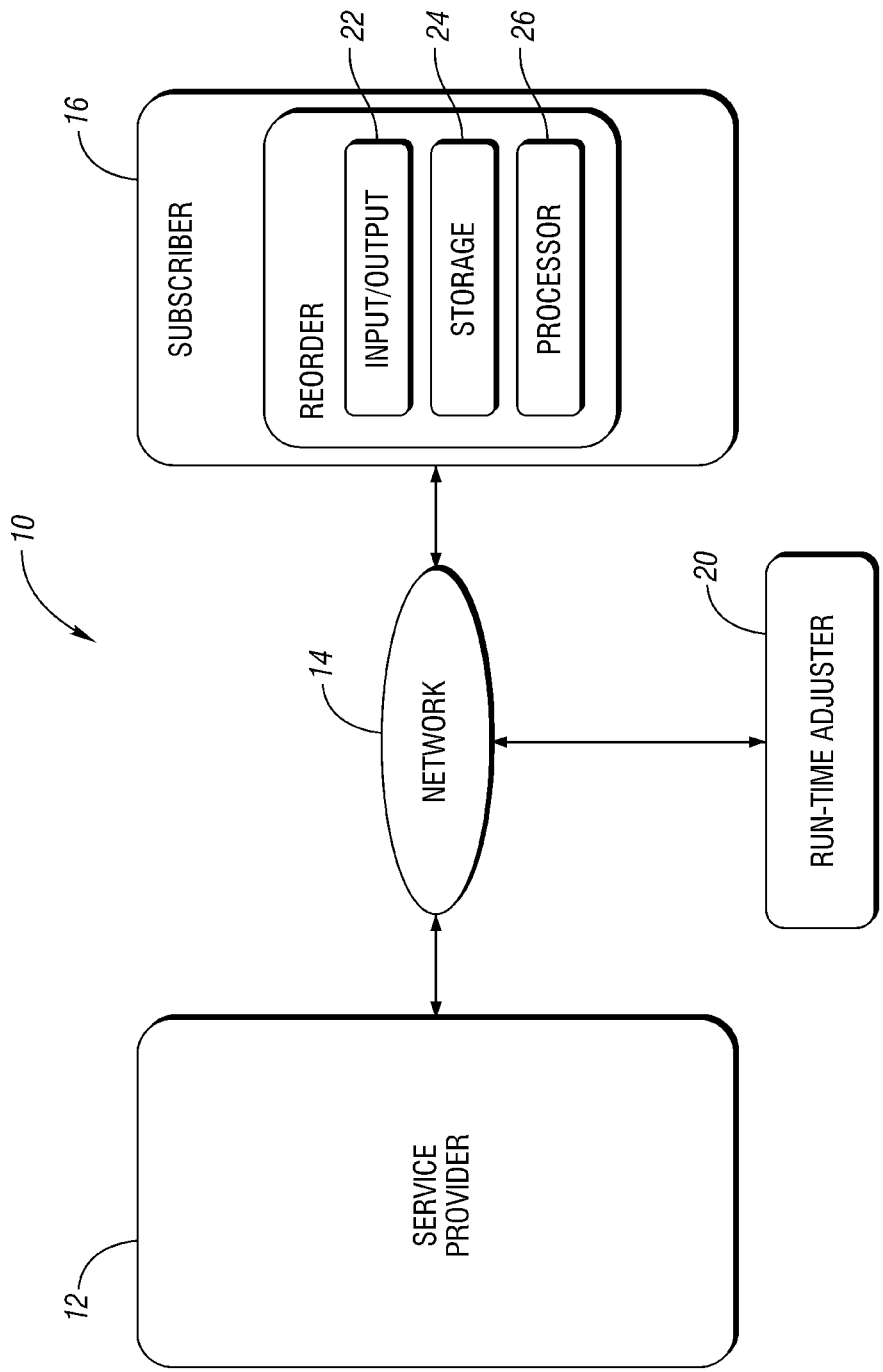
FIG. 1 illustrates a system configured to facilitate automated run-time adjustment in accordance with one non-limiting aspect of the present invention.

FIG. 1 illustrates a system 10 configured to facilitate automated run-time adjustment in accordance with one non-limiting aspect of the present invention. The system 10 is shown for exemplary purposes as being adapted for use in a television environment where a service provider 12 electronically delivers television signals over a network 14 to a subscriber location 16. The subscriber location may include a local recording device 18 configured to record the transmitted signals for subsequent playback. The system 10 includes a run-time adjuster 20 configured to automatically adjust the recording performed by the recorder 18 depending on whether a to be recorded program is actually running longer or shorter than its scheduled run-time.

The service provider 12 may relate to any provider of services, such as but not limited to a broadcast, cable, or satellite service provider, and/or other providers of data, audio, or telecommunication services. The service provider 12, for exemplary purposes, is predominately described with respect to transmitting television signals for recording by the recorder 18. The present invention is not intended to be so limited and fully contemplates the transmission and recording or any type of content, and not just the exemplary described television signals and related television programs.

The recording of the television signals is shown to take place locally at the subscriber location 16 in order to illustrate one exemplary configuration of the present invention. This type of local recording may take place on a digital video recorder (DVR), settop box (STB), computer, or other device having capabilities sufficient to facilitate the operations contemplated by the present invention. The recorder 18 may include an input/output feature 22, such as a tuner, to facilitate operations necessary to capturing the program and other data associated with the program from the transmitted signals for storage on a storage medium 24, processing by a processor 26, and/or for output to a display (not shown).

The recorder 18 resides at the subscriber location to facilitate subscriber-location originating playback of recorded content. The recorder 18, however, may be located remotely from the subscriber location 16, such as at a cable television headend unit, network server, etc., and configured to playback the recording for on-demand viewing at the subscriber location 16. Optionally, the recorder 18 may be based at the subscriber location 16 and configured to support remote playback at locations beyond the subscriber location 16, such as on a mobile phone, portable device, or other node associated with or independent of the network 14 used to carry the related signals.

The run-time adjuster 20 may be configured to support the run-time recording adjustment contemplated by the present invention. The adjuster 20 is shown to be in remote communication with the service provider 12 and recorder 18 in order to show its versatility in executing run-time adjustment for any number of recorders regardless of a location of the recorders 18. This is done for exemplary purposes and without intending to limit the scope and contemplation of the present invention. The adjuster 20 may be the illustrated standalone element/controller and/or an integrated feature integrated into the recording device 18 and/or another device in communication therewith.

The run-time adjuster 20 may be configured in accordance with one non-limiting aspect of the present invention to facilitate automated run-time adjustment to recordings performed by the recorder 18. This may include, for example, adjusting a starting or ending time of a recording relative to a scheduled starting and ending time in order to compensate for the recorded event actually starting earlier or later than the scheduled starting time and/or the recorded event actually ending earlier or later than the scheduled ending time. This allows the present invention to facilitate recordings that are limited to recording content actually desired by a subscriber, instead of arbitrarily recording more or less of the content without regard to the actually "real-life" progression of the content being recorded.

The automated run-time adjustment contemplated by the present invention is predominately described with respect to recording a sporting event or other live event where a scheduled starting time of the event is likely to correspond with an actual starting time of the event but where the scheduled ending time of the event is unlikely to exactly correspond with an actual ending time of the event. Of course, as noted above and described below in more detail, the present invention is not limited to this example and may be used to support adjusting other recording run-time parameters.

The run-time adjuster 20 may be configured to facilitate run-time adjustments according to information or metadata transmitted with the recorded signals so that the recording is not stopped at the scheduled ending time, but instead, stopped short of the scheduled ending should the program actually end earlier than expected to or extended beyond the scheduled ending should the program actually run longer than expected. This may be accomplished with the run-time adjuster monitoring the related signal transmission for the presence of a particular piece of data. The run-time adjuster 20 may determine the program to be ongoing as long as the piece of data is present and/or if the data has not been changed.

The run-time adjuster 20 may be configured to monitor the presence or change of any type or piece of data that can be used to assess a likelihood that the program being recording is actually still ongoing. As such, the present invention is not necessary limited, unless otherwise specified, to relying on any one particular piece or type of data when making run-time adjustments to parameters used by the recording to control the starting and ending times of a recording period.

Figure 2:
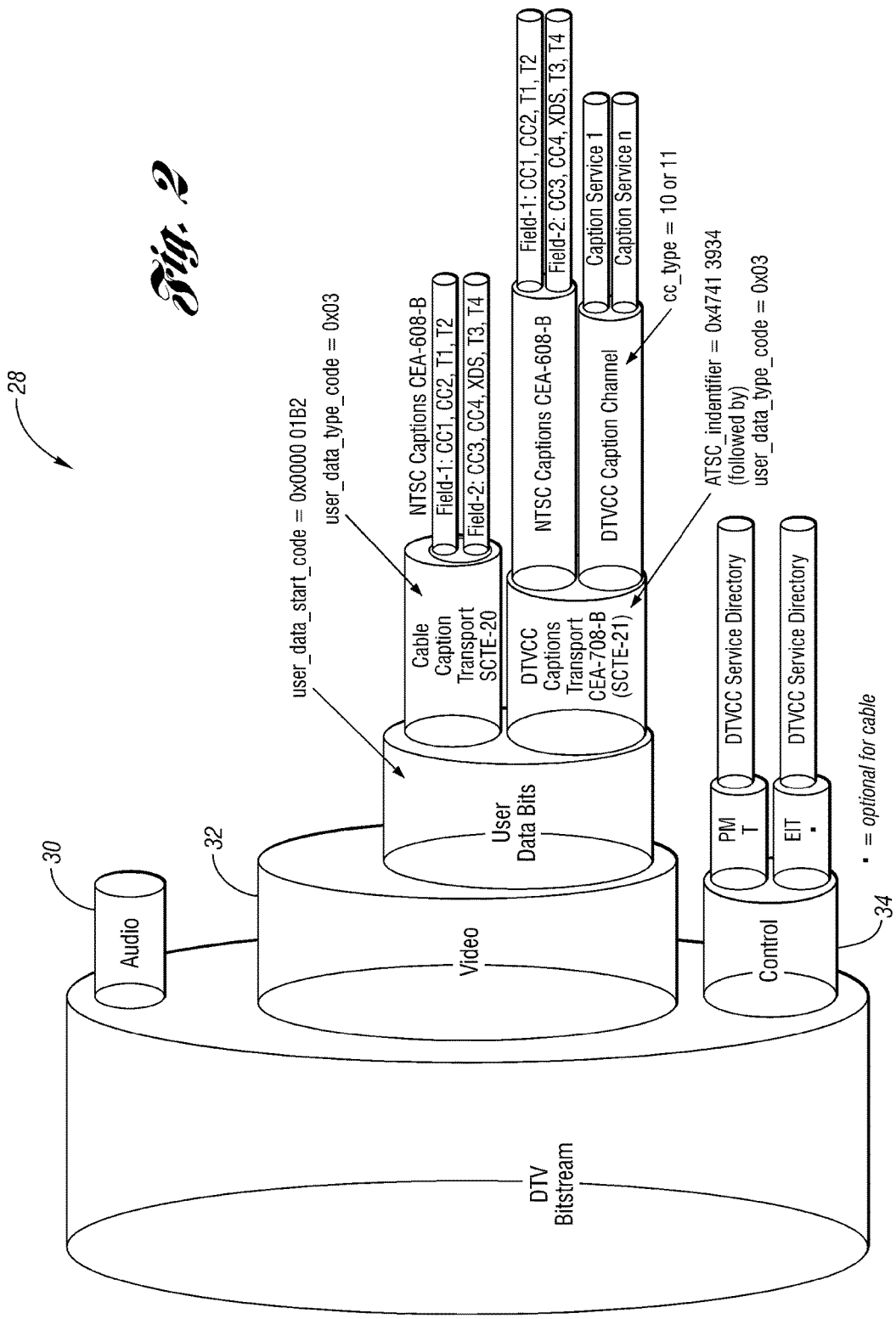
FIG. 2 illustrates a digital television closed captioning (DTVCC) signal that may be used to facilitate transmitting a program in accordance with one non-limiting aspect of the present invention.

FIG. 2 illustrates a digital television closed captioning (DTVCC) signal 28 that may be used to facilitate transmitting a program to be recorded by the recorder in accordance with one non-limiting aspect of the present invention. As shown, the signal 28 may include an audio portion 30, a video portion 32, and a control portion 34. These portions may comprise the information necessary to facilitate all or at least many of the controls and features commonly used in cable and satellite television industries to support electronic programming guides (EPGs), closed captioning text display, etc.

The video portion 32 may include a closed caption portion that carries information related to closed caption services, such as services associated with displaying closed caption texts on a television screen and other services where information specific to the transmitted content is relied upon to support content specific operations.

The closed caption portion may be divided into captioned and non-captioned data. The captioned data includes data that reflects ongoing events in the program, such as data used to facilitate the text displayed on the screen that represents audio communication taking place in the program. The captioned data may be generated and updated continuously throughout the program, and typically, immediately after occurrence of a particular action within the event, as opposed to being determined before the event or before transmission of the program.

The non-captioned data, in contrast, includes extended data services (XDS) data and/or other similar types of data that is not necessarily changing throughout the program, such as information related to program title and genre. In the closed caption portion of the signal this non-caption data can be considered, and hereinafter periodically referred to as, "program information data" that is determined before the program is transmitted and fixed throughout the period of transmission.

Depending on the signal transmission protocols and standards used to support signal transmissions, such as moving pictures expert groups (MPEG) and advanced/nation television system committee (ATSC/NTSC), various types of program information data may be used to support the operations contemplated by the present invention. Some programming may contain Program and System Information Protocols (PSIP) data. This PSIP data may be delivered independently of caption data and may include specific program details about one or more simultaneous programs present in a given transport stream. Like XDS data, the PSIP data may include title and genre information. Program and system information protocol (PSIP) data and extended data service (XDS) data are at least two of the types of program information data that may be used to facilitate the operations contemplated by the present invention.

The program information data may be advantageous in reducing processing and storage demands on the run-time adjuster since it is not necessarily changing throughout the program transmission, or at least not as often as the captioned data is changing. The program information data may be specified prior to transmission of the program and remain constant through the entire program. In some case, the program information data may only be periodically transmitted in a carrousel arrangement or transmitted when it is changed such that the last transmission of program information data may be used by the run-time adjuster until a subsequent transmission is received.

Changes to the program information data typically only occur when a particular television channel or other data stream used to transmit the program begins to transmit another program scheduled to air after the recorded program. One non-limiting aspect of the present invention contemplates assessing this change in program information data and adjusting the scheduled recording period depending on whether the change is occurring before or after the scheduled ending of the recording period. The run-time adjuster can be configured to monitor for the presence of one or more pieces of the program information data and to instruct the recorder to stop recording, either before or after the scheduled ending, depending on the continued presence or change of the monitored program information data.

Beyond just stopping a recording, the run-time adjuster may be configured to facilitate adjusting a scheduled recording of a program following a program that has exceeded is scheduled run-time. This may include the run-time adjuster delaying recording of the following program until the change in non-captioned data reflects the end of the prior showing program and/or by instructing the recorder to record the following program from another channel, such as if another channel is constructed in switched or on-demand system to support on-time transmission of the following program. The run-time adjuster can be used in this manner to adjust recording periods for any number of scheduled recordings depending on whether the programming is varying from its scheduled run-time and/or depending on whether a prior program has varied form its scheduled run-time.

Figure 3:
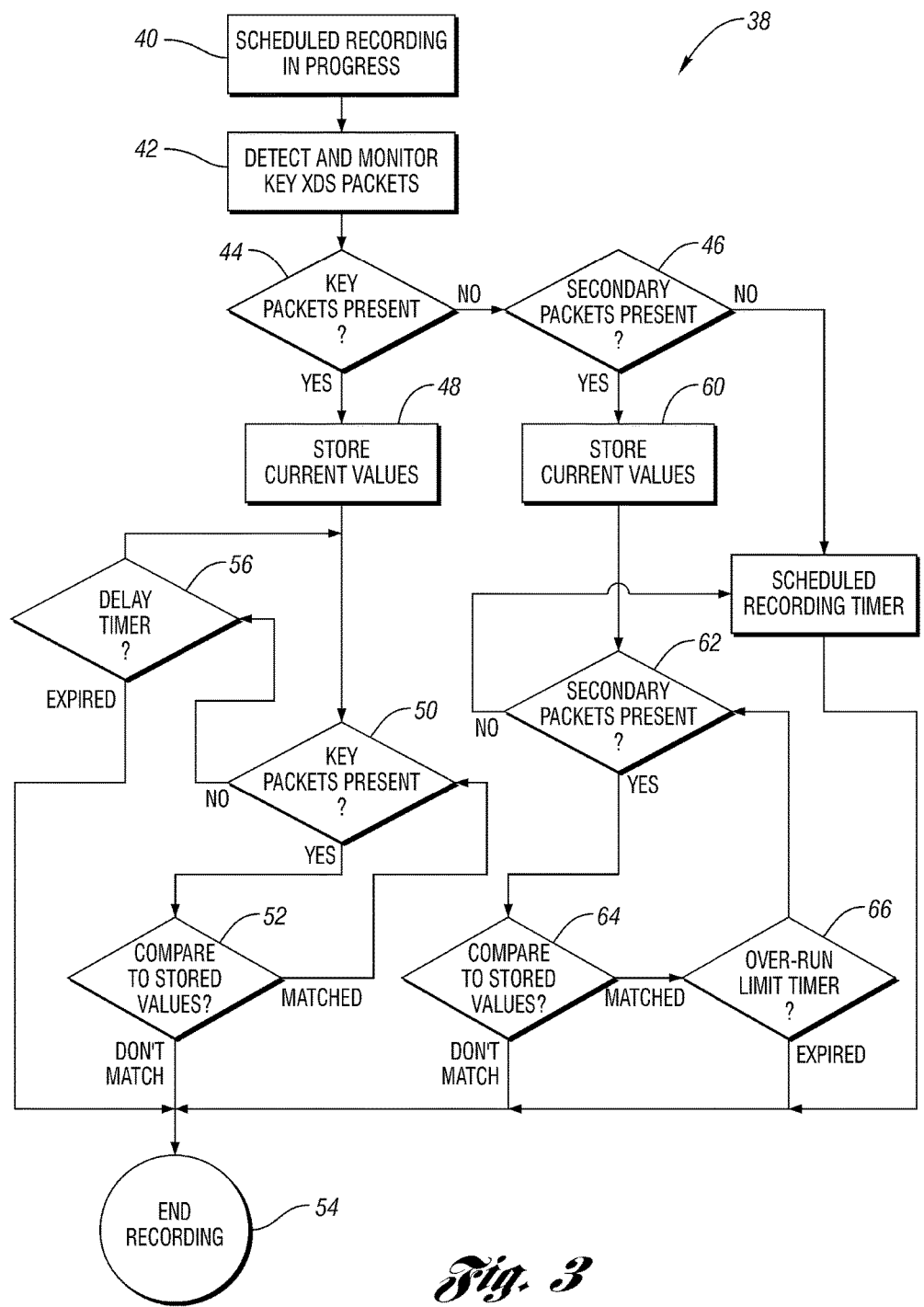
FIG. 3 illustrates a method of automated run-time adjustment in accordance with one non-limiting aspect of the present invention.

FIG. 3 illustrates a flowchart 38 of method of automated run-time adjustment in accordance with one non-limiting aspect of the present invention. The method may be implemented with the assistance of a computer-readable medium and/or with the assistance of any number of logically processing elements used within any environment applicable to the present invention, such as with the assistance of the above described run-time adjuster and recorder. Each of the operations described below need not necessarily be executed or executed in the described order as variations may be made in accordance with the scope and contemplation of the present invention.

Block 40 relates to assessing whether a scheduled recording is in progress. This may occur before the program actually begins transmitting, such as when a subscriber manipulates an EPG to schedule recording of a program to be aired at a later point in time, and/or after the recorder has begun recording signals used to transmit the program. In either scenario, block 40 generally relates to assessing a desire to record a program scheduled to run for a particular period of time and assessing the scheduled beginning and ending of the recording period.

Block 42 relates to determining data relevant to assessing progress of the program destined to be recorded. This may include reliance on the above-identified non-captioned/program information data, as referenced to in the flow chart as 'key XDS packets.' Other types of data, however, may be used without deviating from the scope and contemplation of the present invention. The monitored data may be of the type that changes with the programs being broadcasted such that they are specific to the program and/or other programs commonly falling within a related classification captured by the data.

Optionally, the data may be assigned and associated with the program in advance of its transmission. This information can be stored in a look-up table at the service provider or other medium accessible to the run-time adjuster so that it can be cross-referenced with signals being transmitted to a subscriber associated with the recording recorder to assess whether the program to be record has begun or ended. Blocks 44, 46 relate to assessing whether the data is of a first or second type in order to limit how long the recording period is extended as a function the reliability or believability that the monitored data accurately reflects the actual ending of the program.

Block 44 relates to assessing whether the monitored data is of the first type, or as labeled in the Figure as being 'key'. The first type of data may be a more reliable indicator of the program being transmitted than data of the second type. For example, a piece of data of the first type may be a title of the program whereas a piece of data of the second type may be a genre of the program. While both pieces of data are specific to the program, the first piece is more likely to be a better indicator of the program than the second piece since the second piece may be used with a following program. An assessment of the likelihood of the piece of data being specific to the program or a following program may be made to determine whether the data is of the first or second type.

If the data is of the more reliable first type, the data is stored in block 48 to facilitate monitoring for its continued presence in block 50. Its presence may be determined as long as the data is still carried within the transmitted signals and/or as long as the run-time adjuster has not received any changes to previously received data. Block 50 includes monitoring the channel currently being recorded to assess whether it includes data of the first type, and if it does, determining in block 52 whether that data corresponds with data assigned to the programmed identified for recording. If data of the first type is present and fails to match the stored data, then block 54 is reached and the recording is stopped. If the data matches the stored data, block 50 is returned to and the recording continues until the data changes.

In some cases the data may change without being replaced with other data, such as if the monitored data is no longer carried within the transmitted data. This may occur, for example, when a following program begins transmitting and does not employee the same data field. This type of scenario can optionally be detected with reliance on other transmitted data so that this absence of the monitored data is not confused with the monitored data intentionally being absent between intermittent data transmissions. Block 56 sets a delay timer for which the recording is allowed to continue while block 50 continues to monitor for the presence of the monitored data. If, after some limited number of cycles the monitored data does not re-appear, block 54 is reached and the recording is stopped.

This process of monitoring for the data of the first type allows for the indefinite recording of the program as long as the monitored data is present within the transmitted signals. To guard against brief interruptions and the like, the optional delay timer may be added to insure that the recording is not inadvertently stopped due to a temporary absence of the monitored data. If data of the first type is not available, such as if there is no obligation to send the data or the data sent is vague and/or not necessarily a believable, unique indicator of the program, block 46 assesses the presence of data of the less reliable second type. The present data is stored in block 60 to facilitate monitoring for its continued presence in block 62.

The presence of the less reliable data of the second type may be determined as long as the monitored data is still carried within the transmitted signals and/or as long as the run-time adjuster has not received any changes to previously received data. Block 62 includes monitoring the channel currently being recorded to assess whether it includes data of the second type, and if it does, determining in block 64 whether that data corresponds with data assigned to the programmed identified for recording. If the data matches the stored data, block 62 is returned to and the recording continues until the data changes.

Block 66 sets an over-run limit timer to correspond with some finite period of time for which the ending of the recording period may be extended before the recording is terminated in block 54. This finite period of time insures that the recording is not indefinitely extended based on the less reliable data of the second type. Because there is a greater chance that data of the second type could be used in a following program, the finite extension period prevents the ending of the recording from being extended too long and only to a certain degree that balances the recording extension according to the likely accuracy of the data relied on to extend the recording.

If data of the second type is no longer present, then block 68 is reached and the end of the recording is not adjusted so that it ends as originally scheduled. This process of monitoring for the data of the second type allows for the finite recording of the program, even if the monitored data is present within the transmitted signals. Unlike the more reliable data, the data of the second type cannot be used to permit the indefinite extensions of the recording period beyond the scheduled ending. Optionally, the extensions based on the more reliable data of the first type may be capped if the period of time runs so long that it becomes more likely than not that an error has occurred within the system.

As supported above, DVRs (VCRs) or other television recording systems may fail to capture the end of programs that run overtime when the user doesn't anticipate a longer program or manually extend the recording duration. This may be because the event schedule information used to control the start and stop points for the recoding are not adjusted in real-time with the actual, 'real-life' progress of the program. This scheduled event information (electronic program guide data) may be difficult to update in real time and the delivery mechanisms for this data takes so long that the recording device is unable to respond with the needed reaction time to extend a program while it happens.

The FCC has recently enacted rules (FCC-07-228A1) to force broadcasters to provide more time-sensitive updates to the event information tables in PSIP (event schedule information). While these new rules may be helpful they are not sufficient to solve the real-time recording extension problem because they do not address the transmission time required for data carousels to deliver the updates, nor do they specify the frequency by which the receiver needs to reacquire the event information tables used to control the recording.

The pending FCC rules also require or presuppose that each local affiliate broadcaster has the necessary and expensive station automation systems needed to couple real-time programming changes directly to the PSIP generators. Since many of these smaller markets are unlikely to spend the money to add this station automation gear, the FCC is likely to give such stations a wavier, creating a fragmented market where only some stations provide the real-time PSIP updates.

One non-limiting aspect of the present invention solves a long-standing problem with recordings of live events that run overtime. It does so without the need for additional equipment or signaling and it applies equally to broadcast, satellite or cable distribution of video programming. One non-limiting aspect of the present invention contemplates achieving this with a recording controller application in a recording device being modified to include the ability to read certain program specific data available in either analog television signals as line-21 data or in digital (MPEG) program streams as video user bits. Both of these types of data may be designed to provide frame-accurate real time data for captioning as well as "extended data services" (XDS), i.e., one element of the XDS data is the parameter for program-name or program description.

This data is typically inserted when the captions are provided and is distributed as part of the video stream. Because this data is tied to the video, it almost always is switched when the program changes from one event to another. For live events, such as sporting events, award shows or other live events, the caption stream is provided in real time as part of the production process. A sporting event that runs long, will continue to include real-time caption data that includes the proper name of the program, even when the PSIP or schedule information is not updated. When the first program finally ends beyond its scheduled end time, and the station switches to the normally scheduled program, that program will by definition have a separate caption stream (just like it has a separate audio stream).

The transition (or lack of one) between these two streams can be detected and used to extend or determine the true end-of-program for the purposes of a recording. For analog programming, XDS data can be found on Line-21, field 2. For digital (MPEG) programming, XDS data can be found within the video user bits, and the DTVCC stream, identified as cc_type=00 or 01 as shown in FIG. 2. One non-limiting aspect of the present invention contemplates, a few minutes before the recording control application senses the scheduled end of a recording event, capturing this XDS data and monitor key data fields for relevant changes, depending on the content or source, only some of these data fields may be populated. If key fields are detected and are not updated with new information at the time the scheduled recording is due to end, the recording control application can extend the recording as needed until either the key fields detected are changed, or have ended. The changing of these key fields will be an indication that a new program has begun and the scheduled recording will finally end. The changing of these key data fields (packets) can also be used to signal early termination of a recording when an event ends before the scheduled time. The key data fields (packets) that may be used to detect program continuation include: Current Class 0x03 Program Name; Current Class 0x0C Composite Packet-1; Current Class 0x0D Composite Packet-2; Current Class 0x10 to 0x17 Program Description.

While the following packets may not be deterministic regarding the extension of a given program, they may be used to recognize the beginning of a new program with certainty when they change: Current Class 0x04 Program Type; Current Class 0x05 Content Advisory; Current Class 0x06 Audio Services; Current Class 0x08 Copy and Redistribution Control Packet. These can be used to identify early termination of the program and they may be used with additional logic to extend the program in the event that the deterministic packets identified above are not present in the stream. If one or more of these packets are detected, and updated some period after the scheduled recording was due to expire, it will indicate with certainty that a new program has started.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed is:

1. A runtime adjustment system configured to adjust a recording time of a media program having a start time and an end time, comprising:
    a runtime detector having a first input for receiving, from a video source providing the media program, a digital signal facilitating transmission of the media program, wherein the digital signal includes video data and runtime adjustment data specific to the media program, and wherein the runtime detector is configured to monitor the digital signal and detect the runtime adjustment data and having a first output for transmitting a result based on the runtime adjustment data; and
    a runtime adjuster having a second input for receiving the result based on the runtime adjustment data from the first output of the runtime detector and having a second output configured to control the recording time as a function of the result based on the runtime adjustment data of a media program recording device equipped to record the media program between the start time and the end time.

2. The system of claim 1, wherein the runtime adjuster controls the recording time of the media program recording device by adjusting the end time of the media program as a function of the result based on the detected runtime adjustment data.

3. The system of claim 1, wherein the runtime adjuster controls the recording time of the media program recording device by adjusting the start time of the media program as a function of the result based on the detected runtime adjustment data.

4. The system of claim 1, wherein the detected runtime adjustment data associated with the media program is data continuously present during transmission of the media program.

5. The system of claim 1, wherein runtime adjustment data is uniquely associated with the media program.

6. The system of claim 1, wherein the runtime adjustment data is assigned and associated with the media program in advance of its transmission.

7. The system of claim 1, wherein the runtime adjuster adjusts record time based on data associated with MPEG data, XDS data, or PSIP data.

8. The system of claim 1, further comprising the recording device having a device input, a first device output, a non-transient storage medium, and a processor, wherein the recording device is configured to receive instructions from the runtime adjuster at the device input which are processed by the processor to extend the end time of the media program as a function of the result based on the detected runtime adjustment data.

9. The system of claim 8, wherein the recording device is a remotely located recording device not at the user's location.

10. The system of claim 9, wherein the remotely located recording device is a network server.

11. The system of claim 9, wherein the remotely located recording device is located at a cable headend unit.

12. A media recording system with remote playback capabilities, comprising:
a recorder in electronic communication with a storage medium configured to capture media content transmitted over a device a first network from a media service provider and storing the captured media content on the storage medium as recorded media content, wherein the captured media content includes video data and program information data different from the video data, and wherein a runtime of the captured media content is based on the program information data specific to the captured media content; and
a remote playback device configured to transmit the captured media content from the storage medium to a remotely located playback device at least in part over a second network upon request by a user.

13. The media recording system of claim 12, wherein the recorder is a local recording device that resides at the user's primary residence capable of electronic communication with a local on-demand playback device at the user's primary residence and a remote on-demand playback device located remotely from the user's primary residence.

14. The media recording system of claim 13, further comprising the storage medium and wherein the recorder, the storage medium, and the remote playback device are configured as a single unit and selected from the group consisting of a digital video recorder, a set-top box, a network server, and a computer.

15. The media recording system of claim 12, wherein the recorder is a remotely located recording device implemented by one or more network servers capable of electronic communication with an on-demand playback device at the user's primary residence and a mobile on-demand playback device capable of being located remotely from the user's primary residence.

16. The media recording system of claim 12, wherein the recorder is a remote recording device located at a headend device capable of electronic communication with an on-demand playback device at the user's primary residence and a mobile on-demand playback device located remotely from the user's primary residence.

17. The media recording system of claim 12, wherein the first network and the second network are the same network.

18. The media recording system of claim 12, wherein the recorded media content is recorded from a signal transmitted over the first network to the storage medium and played back from a signal transmitted over the second network to a remote on-demand playback device.

19. The media recording system of claim 12, wherein the first network is a network associated with a cable network.

20. The recorder of claim 19, wherein remote playback occurs on a node remote from the user's primary residence and associated with the first network.

21. The recorder of claim 19, wherein remote playback occurs on a node remote from the user's primary residence and associated with the second network.

22. The recorder of claim 19, wherein the second network is a network associated with a mobile telephone network.

23. The recorder of claim 19, wherein the second network is the Internet.

* * * * *